(12) United States Patent
Verhoest et al.

(10) Patent No.: US 11,820,603 B2
(45) Date of Patent: Nov. 21, 2023

(54) FEEDER DEVICE FOR FEEDING A POWDER MATERIAL

(71) Applicant: GEA Process Engineering NV, Halle (BE)

(72) Inventors: Bart Verhoest, Niel (BE); Guido Vital Judith Geukens, Meerhout (BE); Alexander Clemens Henricus Josef Schaepman, Breda (NL); Johannes Adrianus Jozef Maria Vugts, Gravenmoer 's-Hertogenbosch (NL)

(73) Assignee: GEA PROCESS ENGINEERING NV, Halle (BE)

( * ) Notice: Subject to any disclaimer, the term of this patent is extended or adjusted under 35 U.S.C. 154(b) by 170 days.

(21) Appl. No.: 17/429,749

(22) PCT Filed: Feb. 11, 2020

(86) PCT No.: PCT/EP2020/053462
§ 371 (c)(1),
(2) Date: Aug. 10, 2021

(87) PCT Pub. No.: WO2020/165165
PCT Pub. Date: Aug. 20, 2020

(65) Prior Publication Data
US 2022/0097978 A1    Mar. 31, 2022

(30) Foreign Application Priority Data
Feb. 11, 2019   (DK) .................................. 2019 70094

(51) Int. Cl.
*B65G 33/18*   (2006.01)
*B65G 33/26*   (2006.01)

(52) U.S. Cl.
CPC ........... *B65G 33/18* (2013.01); *B65G 33/265* (2013.01); *B65G 2201/042* (2013.01); *B65G 2812/0511* (2013.01); *B65G 2812/0594* (2013.01)

(58) Field of Classification Search
CPC .............................. B65G 33/18; B65G 33/265
See application file for complete search history.

(56) References Cited

U.S. PATENT DOCUMENTS

| 934,603 A | 9/1909 | Gedge |
| 1,917,827 A * | 7/1933 | Cloos ..................... B65G 33/22 |
| | | 406/61 |

(Continued)

FOREIGN PATENT DOCUMENTS

| CN | 204587938 U | 8/2015 |
| DE | 1531934 A1 | 9/1969 |

(Continued)

OTHER PUBLICATIONS

International Search Report issued in corresponding PCT Application No. PCT/EP2020/053462, dated Apr. 24, 2020, pp. 1-4.

*Primary Examiner* — William R Harp
(74) *Attorney, Agent, or Firm* — Robinson & Cole LLP

(57) ABSTRACT

A feeder device for feeding powder, having a barrel feeding channel with a downstream end. The feeding channel including at least one conveying element for conveying the powder material to the downstream end. A rotatable exit element provided at the downstream end of the feeding channel. The rotatable exit element includes an annular portion defining exit openings defined by powder engaging edges. The rotatable exit element is positioned transversally outside the barrel in a proximity of the downstream end of the feeding channel. The feeding channel has a first, inner diameter and the rotatable exit element has a second, outer diameter, (Continued)

where the second, outer diameter is equal to or larger than the first inner diameter.

36 Claims, 10 Drawing Sheets

(56) References Cited

U.S. PATENT DOCUMENTS

| | | | |
|---|---|---|---|
| 2,699,272 A | | 1/1955 | Barth |
| 2,991,870 A | * | 7/1961 | Edwin .................... B65D 88/68 |
| | | | 366/291 |
| 3,508,687 A | | 4/1970 | Burgstaller |
| 3,804,303 A | | 4/1974 | Fassauer |
| T952,011 I4 | | 11/1976 | Coote et al. |
| 5,044,757 A | | 9/1991 | Dienst |
| 5,333,762 A | | 8/1994 | Andrews |
| 5,439,147 A | | 8/1995 | Bitschnau |
| 6,010,037 A | | 1/2000 | Thompson |
| 6,322,244 B1 | | 11/2001 | Marchesini et al. |
| 8,556,129 B1 | | 10/2013 | Hirsch |
| 2006/0006258 A1 | | 1/2006 | Remon et al. |
| 2013/0306672 A1 | | 11/2013 | White |
| 2014/0373381 A1 | | 12/2014 | Kaeb et al. |
| 2017/0274331 A1 | | 9/2017 | Edelman et al. |

FOREIGN PATENT DOCUMENTS

| | | | |
|---|---|---|---|
| DE | 3502765 A1 | * | 7/1986 |
| DE | 19602227 A1 | | 7/1997 |
| DE | 102005048176 A1 | | 4/2007 |
| EP | 0217209 A1 | | 4/1987 |
| EP | 0571778 A1 | | 12/1993 |
| EP | 1072541 A1 | | 1/2001 |
| EP | 1582467 A1 | | 10/2005 |
| EP | 1749769 A1 | | 2/2007 |
| EP | 1783054 A1 | | 5/2007 |
| EP | 1565258 A1 | | 12/2011 |
| FR | 2924693 A1 | | 6/2009 |
| JP | 5995014 A | | 6/1984 |
| JP | 039328 U | | 1/1991 |
| JP | 2004089441 A | | 3/2004 |
| WO | 03093561 A1 | | 11/2003 |
| WO | 2004047974 A1 | | 6/2004 |
| WO | 2018050668 A1 | | 3/2018 |

* cited by examiner (a)

(b)

(c)

(d)

(e)

FEEDER DEVICE FOR FEEDING A POWDER MATERIAL

CROSS REFERENCE TO RELATED APPLICATION

The instant application is a U.S. National Stage application of and claims priority to PCT/EP2020/053462, filed on Feb. 11, 2020, which is a PCT application of and claims priority to DK Application No. PA 2019 70094, filed on Feb. 11, 2019.

BRIEF DESCRIPTION

The present invention relates to a feeder device for feeding a powder material.

BACKGROUND

For the production of pharmaceutical tablets its raw material constituents may comprise compounds, such as so-called Active Pharmaceutical Ingredients (API), as well as excipients, which are generally pharmacologically inactive ingredients added to the API's to act as filler or matrix, for example magnesium stearate and optionally further additives. These compounds often are in particulate form that may require granulation (agglomeration) to improve their flowability during transport and other process properties needed for enabling subsequent tablet compaction in a tablet press. A number of granulation technologies are available, often depending on the type of API being used and the required tablet characteristic, e.g. granulation devices such as dry granulation in e.g. roller compactors, melt granulation, or wet granulation in extruders, spheronizers, fluid bed spray granulators, high shear granulators or twin screw wet granulation combined with fluid bed drying.

Powder or powder material is herein defined as a collection of a plurality of finely divided solid substances comprising one or more compounds, whereof any given percentage of these substances can be in such a granulated state—i.e. an agglomerated (dried) state. Further, as a construct, all or any air or gas as well as humidity between and in the powder is seen as also constituting the powder. Often an increased percentage of granulates e.g. above 20% by volume or by weight relative to the powder material—is an advantage in that this generally improves flowability, provides a better certainty of API concentration/distribution, ease of dissolution in liquids, and ease of compression.

In order to provide a continuous tablet production process, in contrast to a batch wise process, an eased transfer as well as transportation and a more exact dosing of the powders as well as the granulates between raw material containers through to granulation and on to the tablet press is required. Such transportation and dosing may be implemented with feeders and often requires a more steady flow of a uniform amount or amounts of powders and/or granulates per time unit, often in a relatively small amount and over longer or shorter distances. Thus, more accurate and uniformly distributing transport and dosing devices, such as feeders, are advantageous generally, and in particular for pharmaceutical powder transport and dosing. The term "Feeding" herein generally means the movement or transport (flow) of a given amount (mass over a unit time) of material such as powder e.g. to a next step in a process. The term "Dosing" herein generally means the release after feeding of a specific amount (mass over unit of time) of material such as powder and implies that this amount over time is a known, set or desired amount over time. Often, in order to reach such specific amount, it is desired to achieve a consistent, so-called uniform flow between processes.

Feeding and dosing powder material in a uniform flow, possibly in a uniform small volume flow, i.e. a reduced and even mass flow over time, often proves to be a difficult task inter alia depending on characteristics of the powder material.

Such powder can be more or less free-flowing, the flowability being complex and depending on many different factors, such as the physical and chemical properties of the powder and inter-particle interactions, but also on the environment surrounding it, i.e. contacting surfaces, gravity pull, electrostatic forces, atmospheric or gas pressure, temperature and humidity, e.g. affecting the powders ability to move and/or stick together (cohesion) or to the sides (adhesion). The particles and/or agglomerates constituting the powder's tendency to stick together is called the cohesiveness of the powder, which cohesiveness is more simple to observe in practicality than to quantify, measure or control in advance calculation or during transport in particular. Cohesion is thus the property of mutually sticking together between powder particles. Adhesion is the property of sticking together between powder particles and for example adjoining surfaces.

When powders get increasingly cohesive a certain amount of the powder starts to influence the process of feeding/moving it, so that the powder tend to move more slowly relative to its constituting parts, and therefore have a higher inclination to create lumps, i.e. the sticking together of a larger number of powder constituents so to form visible or physically influential size agglomeration shells or surfaces inside or on a surface of the powder, Feeding as well as dosing a powder in a uniform flow in a steady state flow is an ideal condition to reach—but hard or impossible to achieve in practice due to at least the cohesiveness and other mechanical and chemical interactions between the individual particles and/or agglomerates, which again also depends on the particle size distributions of the different particles/granulates and their surface properties such as soft-/hardness or shape.

Thus, for applications in the pharmaceutical industry, it is in some applications advantageous to be able to feed and/or dose quite small powder volumes over time at a uniform rate, e.g. for producing pharmaceutical tablets.

When feeding powders, some powders—due to experienced pressure differences—may tend to stick together in lumps. Pressure differences arise in many different cases: Either inside the feeder due to gravity pressures; due to compaction or pressure build-up during feeding; in case of a screw feeder e.g. between screw and wall, between screws, or outside when exiting the end of an opening/tube/barrel/container. This may create unwanted lumps, larger agglomerates, such as shell formations—in direct dependence on cohesiveness and other flow characteristics—in particular at the exit, where lumps are pushed forwards until gravity pulls them down in a non-uniform way. It is in pharma in some applications advantageous to avoid such lumps because these may lead to so-called "Hot spots" of an Active Pharmaceutical Ingredient (API), i.e. a non-uniform distribution of API inside tablets produced to comprise the powder thus fed, which could pose serious health consequences to the end user, when taking the tablet.

The accuracy of the feeding, whether batch or continuous feeding, is influenced negatively by diverging sizes/masses of any lumps falling out of a feeding channel, such as one provided inside a barrel, into a receiving, e.g. tablet producing, system.

The present applicant has under non-public circumstances made attempts to solve this by providing a grid or mesh or die at the end of the barrel, but also here pressure may build up against the inner side of such die—resulting in uneven agglomerates, lumps, shells, and spaghetti-like strings exiting after the die/mesh/grid.

Other attempts to solve the problem of avoiding lumps, etc. include introduction of additives to reduce cohesiveness. This however is often not possible e.g. in pharma applications where strict requirements apply to content of powder due to risk to consumer, and in other applications where high quality powder blend properties are set or necessary for the further processing thereof.

The present applicant has also under non-public circumstances made other attempts including applying vibrating organs or high-force/short duration hits at screw part or barrel end part which is a different way of solving the problem, but this may be unsuitable for pharmaceutical powders, as they are often sensitive materials that may change physical/chemical form due to forces and pressure introduced by such vibrating, etc.

Further it is envisaged that an air brush might be used to remove by destruction the lumps forming during transport or exit of a feeder.

A feeder device of the art mentioned in the introductory part is generally known from US 2017/0274331 A1, which relates to a dispenser for dispensing agrochemicals, such as talc and graphite, for treatment of seed. The dispenser comprises a barrel wherein is provided a single screw, preferably a spacing element, and a knife assembly with vanes that has similarity with a rotatable exit element. The spacer provides for even compaction of the powder to be dispensed before the knife assembly. The knife assembly shaves or breaks off a continuous and even flow of powdered material out of the discharge opening. The knife assembly has a smaller diameter than the inner diameter of the barrel leaving as mentioned in US'331 preferably a radial clearance or play of 0.06" (1.52 mm). The barrel has a lateral recess at the distal end to provide the discharge opening and to provide for a remaining part of the barrel to extend beyond the discharge opening to provide a hood protecting the discharge opening from wet and sticky seeds.

Other feeder or dispensing devices comprising a feeding channel housing a conveying element and comprising a rotatable exit element inside the feeding channel are known, e.g.:

DE102005048176B4 discloses a device for filling e.g. bags with a flowable bulk material, comprising a screw in a barrel and a fine dosage element at the distal end of the barrel. The fine dosage element comprises a star-shaped element (dosing element) positionable in a passive position outside the barrel for fast and coarse dosage and in an active position inside the barrel.

CN204587938 relates to a dispenser for seasoning (spices) like salt, sugar, pepper, etc. The dispenser comprises a screw having a decreasing pitch and a star-shaped wheel, both of which are placed inside a barrel. The function of the star-shaped wheel is to provide for even and accurate dosage i.e. by preventing material from falling out prematurely.

SUMMARY

The present invention relates to a feeder device for feeding a powder material, comprising a feeding channel with a downstream end, said feeding channel housing at least one conveying element for conveying the powder material to the downstream end, and a rotatable exit element at the downstream end of the feeding channel, said rotatable exit element comprising an annular portion defining exit openings defined by powder engaging edges.

It is an object of the present invention to provide an improved feeder device of the art mentioned by way of introduction, which avoid or minimizes at least some of the above mentioned problems.

It is further an object of the present invention to provide a feeder device that provides for feeding a powder material at a uniform, constant rate i.e. preferably without lumps of different sizes and thus allow for more accurate dosing of often small amounts of powder material.

It is further an object of the present invention to provide a feeder device that provides for feeding a powder material generally without exposing the powder material to excessive pressure gradients, at least reducing the risk of any physical or chemical changes being induced into parts of the powder, which is advantageous when feeding in particular pharmaceutical powders comprising sensitive Active Pharmaceutical Ingredients or other pressure sensitive ingredients.

This is obtained in that the rotatable exit element is positioned outside the feeding channel in a proximity of the downstream end of the feeding channel, that the feeding channel has a first, inner diameter and the rotatable exit element has a second, outer diameter, and that the second, outer diameter is equal to or larger than the first, inner diameter. Hereby is obtained inter alia that any shell formations formed in the feeding channel will be engaged by the rotatable exit element to be broken or disintegrated into smaller parts, such as their constituent parts, such as particles or granulates. In an embodiment the rotatable exit element is positioned in direct proximity to a downstream end of a tubular element such as a barrel; container; or tube wherein the feeding channel is provided. Being positioned in a proximity of the downstream end of the feeding channel, preferably in direct proximity to a barrel or a tube wherein the feeding channel may be provided, the rotatable exit element will—in use—engage with a powder that is conveyed by the conveying element and exited from the downstream end of the feeding channel.

The term "direct proximity" includes that an end face of the barrel or tube, etc., abuts the adjacent side of the rotatable exit element.

In short, the exit element is provided outside the feeding channel, as opposed to prior art feeders/dispensers, which provided dosers such as star shaped elements inside the feeding channel, inside it's barrel, tube or container.

Thus the rotatable exit elements with their powder engaging edges will in use engage powder exiting from the feeding channel, e.g. adhesive powder that exits the feeding channel as a more or less coherent substance, after the powder has exited said channel, and push said powder in a direction generally perpendicular to a longitudinal direction of the feeding channel, thereby disintegrating coherent lumps and shell formations of powder exiting the feeding channel.

In an embodiment the at least one conveying element is a rotatable screw element having an axis of rotation and a direction of intended rotation. Rotatable screw elements are known in the art in many different embodiments, including interrupted screw elements comprising elements provided along an axis of rotation. In a different embodiment of a conveying element it is a rotatable paddle element carrying paddle-like protrusions having a pitch to provide for propelling e.g. a powder in a direction along the axis of rotation.

In an embodiment the conveying element has at least one helical ridge extending along the screw element and defining between windings of the helical ridge at least one helical valley. In a further embodiment two such rotatable screw elements are provided having respective, mutually parallel axes of rotation, and preferably having the same direction of intended rotation. Helical ridges of either of the two rotatable screw elements may extend into helical valleys of an adjacent rotatable screw element, and two rotatable exit elements, one for each end of the conveying elements, may be mounted in staggered positions, the peripheries of the two rotatable exit elements thereby overlapping each other. By providing two or even more screw elements, preferably having ridges extending into neighbouring valleys, a secure transportation is provided for with a minimal risk of the screw circulating the powder material around or even against the conveying direction along the axis of rotation thereby minimizing the retention time for the powder material in the feeding channel and thereby minimizing the collective amount of pressure being applied to and experienced by the powder.

In a further embodiment the at least one screw element comprises at least one helical ridge having a pitch, i.e. a distance between adjacent turns of the helical ridge, with a constant value or a pitch with a value which is increasing towards the downstream end. Hereby there is less risk of a pressure building up on the powder material due to a decreasing pitch i while uniform transportation of the powder material is provided for. However, the skilled person will appreciate that in certain applications a varying and even decreasing pitch may have a positive function.

In an embodiment the at least one screw element comprises at least one helical ridge and a first play is present between a top of said ridge and an internal side wall of the feeding channel, said first play being preferably in the range of 0.5 mm to 2 mm. Hereby is obtained on one hand that the helical ridge does not scrape against the internal side wall of the feeding channel and on the other hand that material is effectively forwarded during use.

In an embodiment the at least one screw element is a concave type screw comprising at least one helical ridge, and valleys between adjacent turns of helical ridge have a curved extent in an axial cross section through the axis of rotation. Hereby may be obtained that a play between two such rotatable screw element may be kept at a minimum preventing material from circulating around a rotatable screw element during the rotation of such screw element, whereby an effect of cleaning the valleys between adjacent turns of ridges is obtained.

In an embodiment the at least one rotatable screw element is an auger type screw element comprising at least one helical ridge, and valleys between adjacent turns of helical ridges have a cylindrical bottom part defining a core of the rotatable screw element.

In an embodiment a second play is present between the at least one rotatable exit element and a downstream end of the feeding channel/barrel/tube, said second play being in the range of 0 to 8 mm, preferably in the range of 0.1 mm to 5 mm, preferably in the range of 0.5 mm to 3 mm. Hereby is avoided a risk of the at least one rotatable exit element rubbing against the end of the feeding channel/barrel/tube wearing off particles from the end face or the rotatable exit element, while ensuring that the size of any lumps do not exceed a certain maximum. When e.g. materials are used that entails that particles are not inclined to wearing off, the play may be practically zero.

In a practical embodiment said at least one rotatable screw element comprises at least one helical ridge and a third play is present between a downstream end of the at least one helical ridge and the rotatable exit element, said third play being in the range of 0 to 11 mm, preferably in the range of 0 to 3 mm. Hereby, the risk of build-up of pressure on the powder material between a downstream end of screw element and the rotatable exit element is generally avoided.

In a further embodiment the at least one helical ridge extends substantially entirely to the rotatable exit element. Hereby, build-up of pressure on the powder material between a downstream end of a screw element and side surface the rotatable exit element facing the screw element is substantially avoided.

In an embodiment a fourth play is present between overlapping portions of two rotatable exit elements, said fourth play being in the range of 0.1 mm to 5 mm, preferably in the range of 0 to 8 mm, preferably in the range of 0.5 mm to 3 mm. Hereby is avoided a risk of two rotatable exit elements rubbing against each other wearing off particles from the rotatable exit elements, while ensuring that the size of any lumps do not exceed a certain maximum. When e.g. materials are used that entails that particles are not inclined to wearing off, the play may be practically zero.

In a practical embodiment the at least one rotatable exit element is planar at the annular portion at least on a side thereof facing the downstream end of the feeding channel. In a further embodiment the annular portion of the rotatable exit element is planar with a thickness in the range of 0.5 mm to 5 mm.

In a practical embodiment the at least one rotatable exit element is fixed to the at least one rotatable screw element for co-rotation therewith around the axis of rotation of the rotatable screw element.

In an embodiment the rotatable exit element comprises a central core portion and a number of protrusions extending away from the central core portion, said protrusions defining between them exit openings for the powder material, when in use, and said protrusions each having a root at the central core portion and a distal end away from the central core portion.

In a further embodiment a diameter of the central core portion is equal to or less than a core diameter of the rotatable screw element at the downstream end thereof. The core diameter may be defined as twice the distance between a bottom of the at least one helical valley, and a central axis such as the axis of rotation. Hereby is obtained that passage of the fed powder material is not obstructed by the central core portion.

In a further embodiment at least two of the protrusions are equidistantly spaced around the axis of rotation.

In a further embodiment at least two of the protrusions are mutually similar in shape and/or in size. These two latter embodiments ease the manufacture of the exit element, as well as provides for a suitable function.

In an embodiment at least one of the protrusions has a constant width from the root to the distal end. This provides for relatively large space between the protrusions i.e. relatively large exit openings.

In an alternative embodiment the roots of at least one of the protrusions is wider than the distal ends of this protrusion. This provides for enhanced strength of the protrusions.

In a further embodiment at least two of the roots of adjacent protrusions meet at a central core portion.

In an embodiment at least one of the protrusions is extending with the root and the distal end positioned on a common radius extending from the axis of rotation.

In an embodiment at least one of the protrusions is extending with the distal end leading in the intended direction of rotation relative to the root. This provides for pushing the powder material in a direction at least slightly inwardly, towards the axis of rotation.

In an embodiment at least one of the protrusions is extending with the distal end trailing in the direction of rotation relative to the root. This provides for pushing the powder material in a direction at least slightly outwardly, away from the axis of rotation.

In an embodiment at least one of the protrusions has a curved extend from the root to the distal end. Hereby it is possible to push the powder material with a concave surface providing a gathering effect or a convex surface providing a spreading effect on the powder material.

In a further embodiment at least one of the protrusions is extending in a C-shape. Hereby the protrusions may have curved extends with a constant curvature or a spiral curvature.

In further embodiments at least one of the protrusions is extending in an S-shape and/or in a Z-shape.

In an embodiment adjacent protrusions define between them the exit openings extending radially towards the axis of rotation to define the diameter of the central core portion.

In an embodiment at least one of the protrusions has at its distal end at least one extension extending generally in a circumferential direction. Hereby the powder material may be contacted from a radial outside as seen relative to the axis of rotation, and further be exited from inside the area enclosed by the extension, when the exit element rotates during use.

In an embodiment at least one of the protrusions are interconnected by at least one circumferential ring portion. Hereby is provided for better strength of the protrusion in the form of mutual support e.g. in case of any of the constituents of the powder material comprising hard materials, such as hard crystals.

In a further embodiment at least one of the distal ends of the protrusions are interconnected by an outer circumferential ring portion.

In an embodiment at least one of the protrusions each have a leading edge and a trailing edge both of which are extending along respective radii extending from the axis of rotation where either a leading edge of at least one of the protrusions, adjacent the downstream end, relative to the intended direction of rotation is rectangular;

and/or a leading edge of at least one of the protrusions, adjacent the downstream end, relative to the intended direction of rotation is forming an acute angle;

and/or a leading edge of at least one of the protrusions, adjacent the downstream end, relative to the intended direction of rotation is rounded or chamfered.

When a rotatable exit element is fixed to a rotatable screw element, the rotatable exit element may be releasably fastened, e.g. by means of a screw connection, by a bolt, by a bayonet arrangement, or by another known releasable fastening means. The feeding channel may e.g. be provided in a barrel or a flexible tube. The barrel or the tube may be attached to e.g. a hopper. A possibility of disassembly may be important e.g. for cleaning which is particularly important in the pharmaceutical industry. In order to disassemble such barrel or tube from a hopper, a rotatable exit element according to the invention may have to be removed before disassembling the barrel or the tube from the hopper. Such removal will be possible when the rotatable exit element is releasably fastened to the rotatable screw element.

In an alternative the rotatable exit element may be integrated, i.e. provided unitary with the rotatable screw element e.g. by being attached thereto by welding and/or adhesive or other non-releasable means, such as is generally known to the skilled person. In the first alternative the rotatable screw element may per se be releasable from a conveying element onto the end of which it is mounted e.g. by a screw connection or by a bayonet arrangement.

By the term "barrel" as used herein should be understood a body, e.g. a rigid body, comprising the feeding channel. By rigid body as used herein should be understood at body that will provide internal side wall of the feeding channel that will substantially not yield by the pressure exerted by the powder during the intended use of the feeder device, and that will substantially not bend in ordinary, intended use. Correspondingly, a flexible tube may either be able to bend whereby a longitudinal, central axis will curve or deform at least slightly, or whereby at least a minor section of an internal side wall of the feeding channel may yield under a pressure exerted by the powder.

In preferred embodiments the central axis is rectilinear.

The edges of the protrusions, especially the leading edges in the course of intended rotation may have any suitable cross section. Such cross section may be defined in a plane tangential to a cylinder coaxial with the axis of rotation and extending at an intermediate radius between the root and the distal end of the protrusions. Thus said cross section may be rectangular providing a leading edge perpendicular to the direction of travel in the rotational movement of the protrusion, the cross section may be triangular providing a slanted leading edge relative to said direction of travel, the cross section may be rounded on one or both edges thereof, etc. Any number of edge shapes are suitable with the purpose to decrease the risk of an increased pressure gradient experienced by the powder, when the feeder device is in use.

The material making up the rotatable exit element may be any suitable metal, ceramics, polymer, elastomer, or combinations thereof; any surfaces thereof preferably being easily cleanable, especially for pharma applications. For pharma applications non-animal materials may be preferred due to regulations (GMP). Further, the stiffness of the rotatable exit element and especially of the protrusions thereof may vary from soft to hard surfaces and soft to hard pliability (flexibility) of not only but in particular the side edges thereof in order to accommodate a gentler edge-pressure on the powder material being fed in the feeder device according to the invention. Even readily pliable (flexible) protrusions, such as feather, whisker or brush shaped protrusions made from e.g. polymer materials may be contemplated.

Especially, some pharma powders need to be handled very carefully because some or all of their constituent parts are sensitive materials, such as in particular crystallized or otherwise fragile API's. Any rough conditions, such as increased pressure gradients experienced during handling, transport, or other processing may change or alter these constituent's physical and/or chemical form. This in in particular so for the forces and pressures introduced during handling such as in a feeder device. For such powders the present invention having the rotatable exit element placed outside the feeding channel may provide an improved handling with a decreased experienced pressure gradient on the powder.

BRIEF DESCRIPTION OF THE DRAWINGS

In the following the invention will be explained in more detail by way of non-limiting examples of embodiments, having reference to the accompanying drawings, in which.

DETAILED DESCRIPTION

Figure 1:
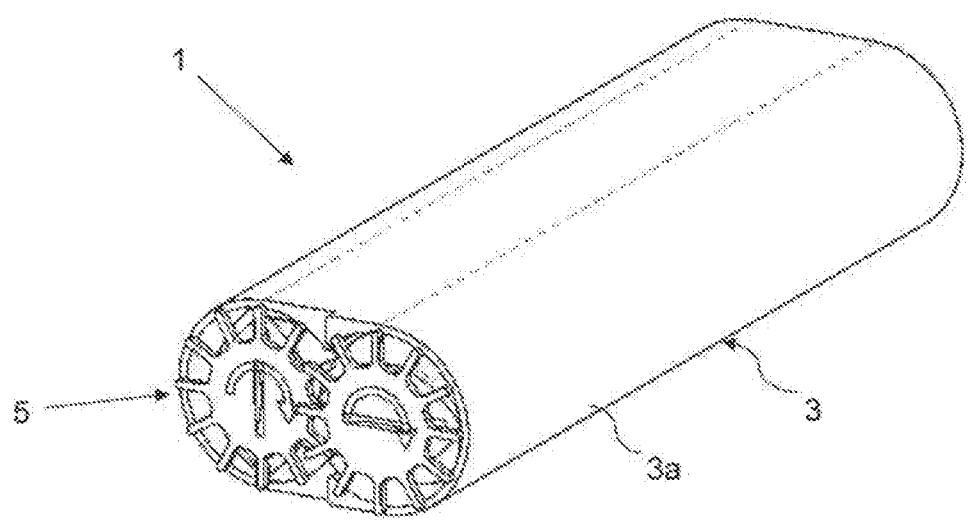
FIG. 1 is a perspective view of a feeder device according to a first embodiment of the present invention.
Figure 2:
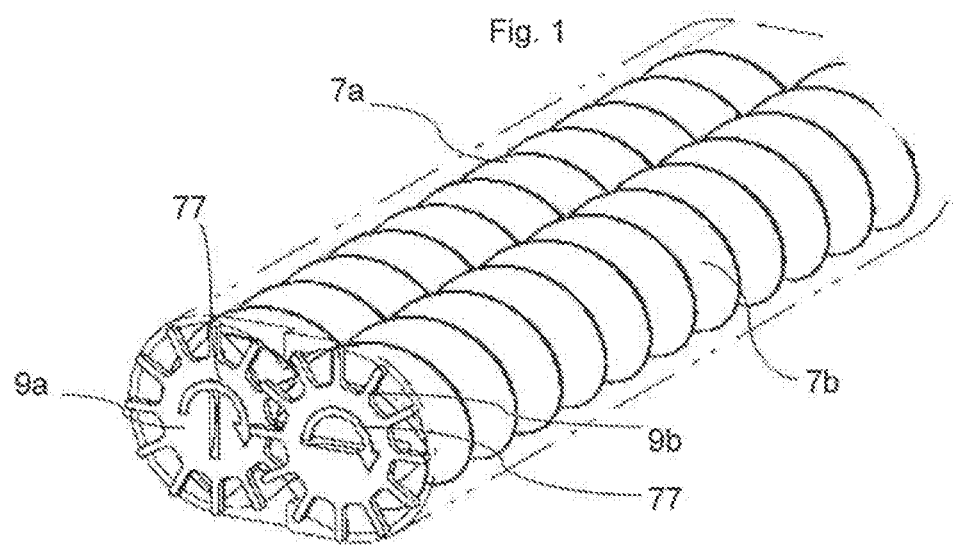
FIG. 2 is a view of the embodiment shown in FIG. 1 with the barrel removed.

Referring to FIGS. 1 to 9 in a first embodiment of the present invention a feeder device 1 for feeding a powder material in a uniform flow, comprises a barrel 3a inside which is provided a feeding channel 3 with a downstream end 5, the feeding channel 3 of the barrel 3a housing a conveying element in the form of two rotatable screw elements 7a, 7b for conveying the powder material to the downstream end 5 of the barrel 3a, and two rotatable exit elements 9a, 9b at the downstream end 5, i.e. also downstream the feeding channel. The rotatable exit elements each comprises an annular portion 11 defining exit openings 13 defined by powder engaging edges 15 (see FIG. 15). The rotatable exit elements 9a, 9b are positioned in proximity to and directly outside the feeding channel of the barrel 3a. The barrel 3a is in the embodiment shown provided by a generally tubular element. The feeding channel of the barrel 3a comprises two merged portions each having a circular outline (see e.g. FIG. 6). The feeding channel 3, i.e. the two merged portions thereof, has a first (of the barrel inner) diameter d, preferably the same diameter, which may e.g. be in the range of 6 mm to 50 mm, preferably in the range of 8 mm to 35 mm and each of the rotatable exit elements 9a, 9b have a second (outer) diameter D which is equal to or larger, preferably slightly larger, such as by 0-8 mm, than the first diameter d.

By placing the rotatable exit elements outside the feeding channel and providing the rotatable exit elements with diameters that are not smaller than the diameter of the feeding channel it is obtained to lower the risk that shell formations are formed in the feeding channel between the inner wall of the feeding channel and the outer surface of the conveying element, and thereby exiting uninhibited from the feeding channel end. Instead, Applicant considers it likely that any lumps forming here instead has a higher likelihood of engaging with the side edge of the rotatable exit elements and be broken into smaller lumps or disintegrated into the therein constituting parts, such as particles or granulates. Further, there is a lower risk that powder being fed through the feeding channel is squeezed or crushed between radially outward tips or protrusions of the rotatable exit element and the inner wall of the feeding channel. Thus the rotatable exit elements 9a, 9b with their powder engaging edges 15 (see FIG. 15) will in use engage powder leaving the feeding channel 3, e.g. cohesive powder that leaves the feeding channel 3 as a more or less coherent substance, after the powder has left said channel and push said powder in a direction generally perpendicular to a longitudinal direction of the feeding channel, thereby disintegrating coherent lumps and shell formations of powder exiting the feeding channel.

Figure 4:
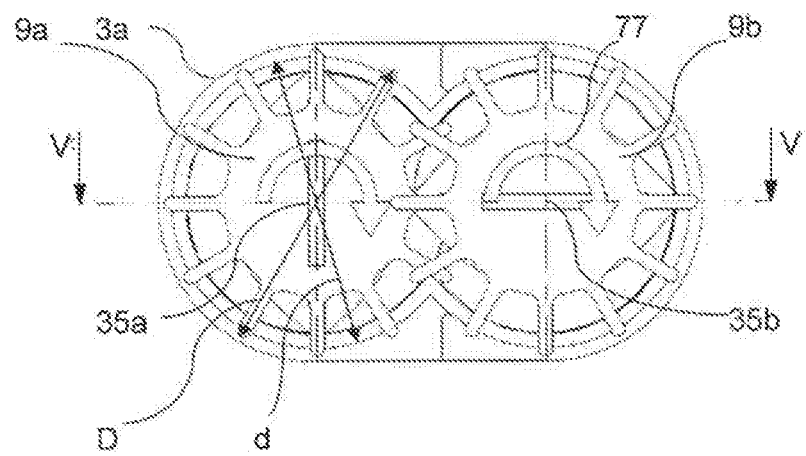
FIG. 4 is a front view of the feeder device shown in FIG. 1 seen from the downstream end of the barrel.

The rotatable screw elements 7a, 7b each has an axis of rotation 7a', 7b', and a direction of intended rotation. As seen in FIG. 4, and indicated by arrows 77, the direction of intended rotation is here clockwise for both rotatable screw elements 7a, 7b. The actual rotation direction chosen is of course dependent upon the how the helical screw is provided, anti-clockwise or clockwise, and then the resulting rotation is clockwise, and anticlockwise, respectively. In the present embodiment the rotatable screw elements each has a helical ridge 17a, 17b extending around and along the screw element and defining between windings of the helical ridge a helical valley 19a, 19b. The two rotatable screw elements 7a, 7b are provided such as to have respective, mutually parallel axes 7a', 7b' of rotation. The helical ridges 17a, 17b of either of the two rotatable screw elements 7a, 7b are extending into the helical valleys 19a, 19b of the adjacent rotatable screw element 7b, 7a, and the two rotatable exit elements 9a, 9b are mounted in staggered positions, so that the peripheries of the two rotatable exit elements 9a, 9b are overlapping each other. By providing two, or even more, screw elements having ridges extending into neighbouring valleys a secure transportation is provided for with a minimal risk of the screw circulating the powder material around the axis of rotation thereby minimizing the retention time for the powder material in the feeding channel and the amount of pressure applied to the powder.

Figure 3:
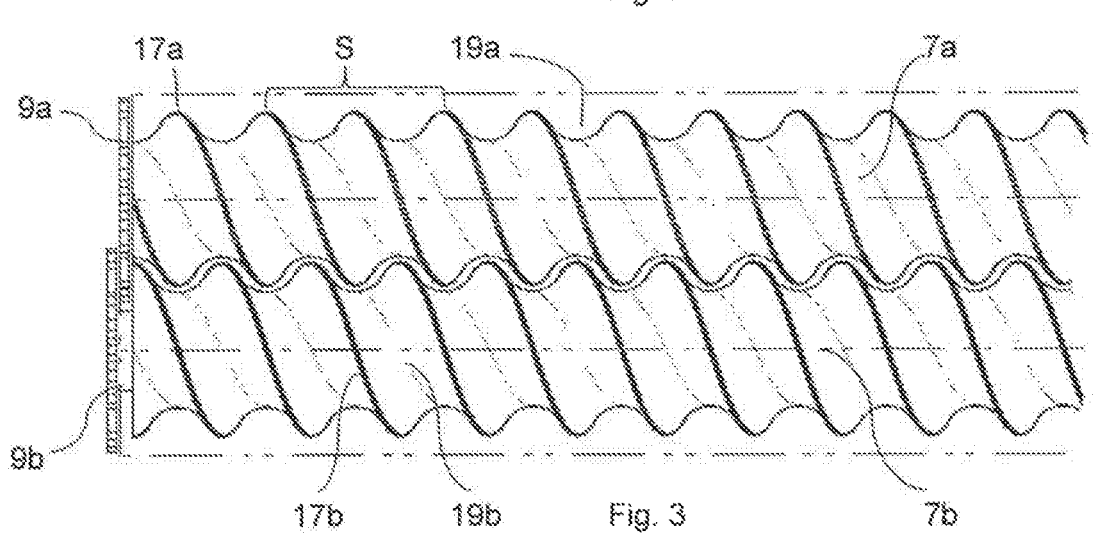
FIG. 3 is a top view of the feeder device shown in FIG. 2.

In the present embodiment the helical ridges 17a, 17b have a pitch S (see FIG. 3) with a constant value. It is noted that the screw elements 7a, 7b as shown e.g. in FIG. 3 are embodied with double-winding screws, i.e. two helixes intertwined with each other. Alternatively, the pitch S might have a value which increases towards the downstream end 5. The constant or (slightly) increasing pitch provides for uniform transportation of powder with constant or slightly decreasing pressure gradient as opposed to a decreasing pitch where the pressure gradient increases.

In the embodiment shown a first play 21 is present between a top of the helical ridge and an internal side wall of the barrel 3a, i.e. a side wall of the feeding channel 3. This first play is preferably in the range of 0.5 mm to 2 mm. Thus on one hand the helical ridge does not scrape against the wall of the barrel and on the other hand material, i.e. powder, is effectively forwarded during use.

In the embodiment shown in FIGS. 1 to 5 the rotational screw elements 7a, 7b are of a concave type screws whereby the helical valleys 19a, 19b between the adjacent turns of the helical ridges 17a, 17b have a curved extent in an axial cross-section through the respective axis of rotation 7a', 7b'. The play between the two rotatable screw elements may be kept reduced thereby preventing material from circulating around on or with a rotatable screw element during the rotation of the screw elements, whereby an effect of cleaning the valleys between adjacent turns of ridges is obtained. This type of concave and self-cleaning screws are generally known in the field to the skilled person.

In the present embodiment a second play 23 (see FIGS. 5 and 9) is present between the respective rotatable exit element 9a, 9b and a downstream end face 25 defining the downstream end 5 of the feeding channel 3. It is noted that the downstream end face 25 of the barrel 3a comprises a step 27 for accommodating the downstream end face to correspond to the staggered positions of the two rotatable exit elements, see e.g. FIG. 7. The second play 23 is in the present embodiment in the range of 0.1 mm to 5 mm, preferably in the range of 0.5 mm to 3 mm. Due to the second play the side surface of the rotatable exit elements 9a, 9b which turns towards the powder surface does not rub against the end face potentially increasing the pressure gradient on that part of the powder surface in the end face of the rotatable exit element. Further a reduced size of the second play 23 ensures that the size of any lumps passing do not exceed a certain maximum, as well as not provide a volume in which an increased pressure is built up on the powder exiting from here.

A third play is present between a downstream end of the helical ridge 17a, 17b and the rotatable exit element 9a, 9b, said third play being in the range of 0 to 11 mm, preferably in the range of 0 to 3 mm.

Thus in an embodiment the helical ridge extends to the rotatable exit element, i.e. the third play is approximately zero.

In general, an advantage of the third play is to avoid or minimize pressure gradients immediately upstream of the rotatable exit elements 9a, 9b due to lack of a propelling force apart from that arising from the powder material arriving at the downstream end 5 of the feeding channel 3.

In the present embodiment with two rotatable screw elements 7a, 7b, and two rotatable exit elements 9a, 9b having overlapping portions, a fourth play 29 is present between the overlapping portions of the two rotatable exit elements 9a, 9b. This fourth play 29 is in the present embodiment in the range of 0.1 mm to 5 mm, preferably in the range of 0.5 mm to 3 mm. The fourth play makes sure that the two rotatable exit elements 9a, 9b do not, in operation, rub against each other thereby wearing off or destroying powder particles or granulates from the rotatable exit elements 9a, 9b. On the other hand, the fourth play should be of such a decreased size as to ensure that the size of any lumps forming when passing between the two rotatable exit elements 9a, 9b do not exceed a certain maximum, as well as not provide a volume in which an increased pressure is built up on the powder exiting from here.

Figure 5:
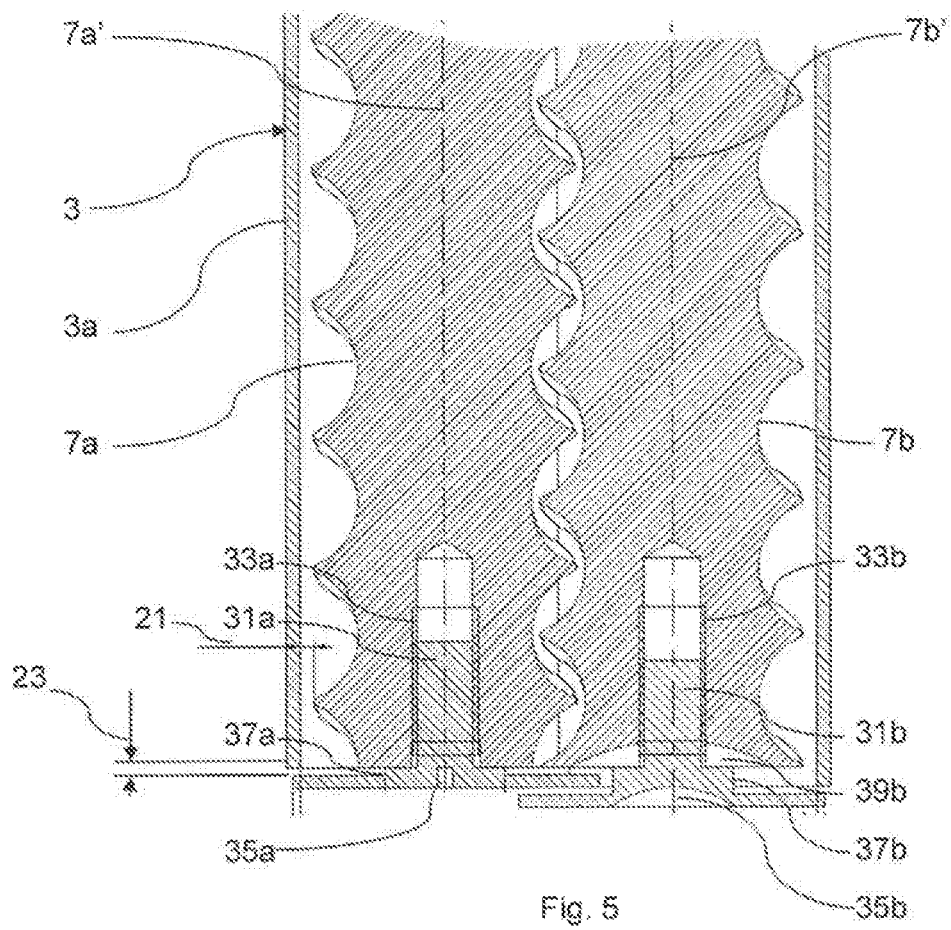
FIG. 5 shows a cross-section along line V-V in FIG. 4.
Figure 6:
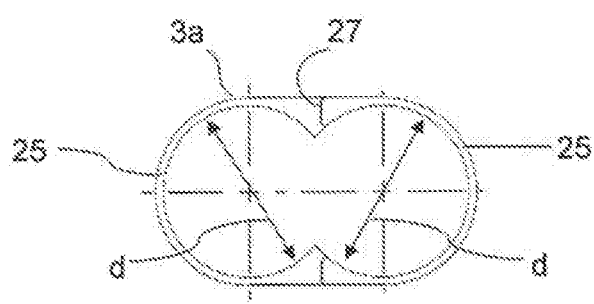
FIG. 6 is a front view of a feeding channel in the barrel of a feeding device as shown in FIG. 1.
Figure 7:
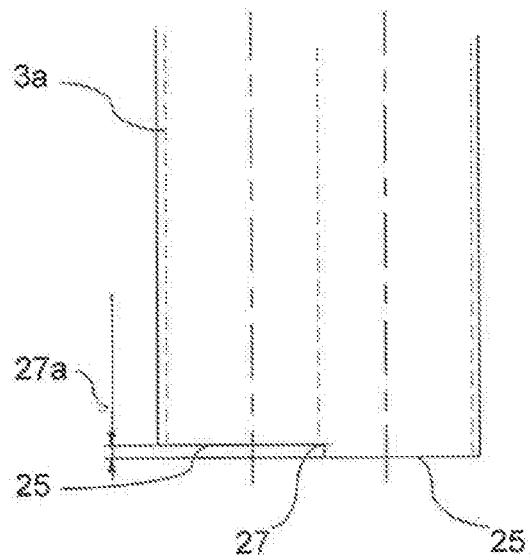
FIG. 7 is a top view of the barrel with the feeding channel of FIG. 6.
Figure 8:
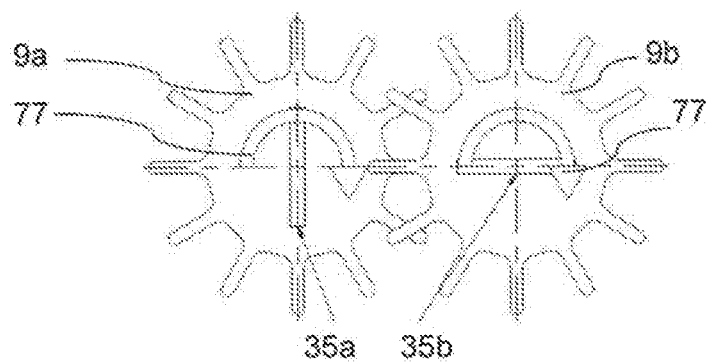
FIG. 8 is a front view of a pair of rotatable exit elements as of the feeding device shown in FIG. 1.
Figure 9:
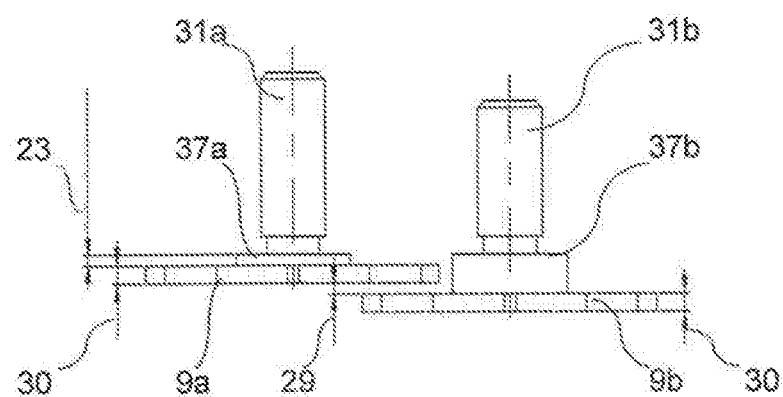
FIG. 9 is a top view of the rotatable exit elements shown in FIG. 8.
Figure 10:
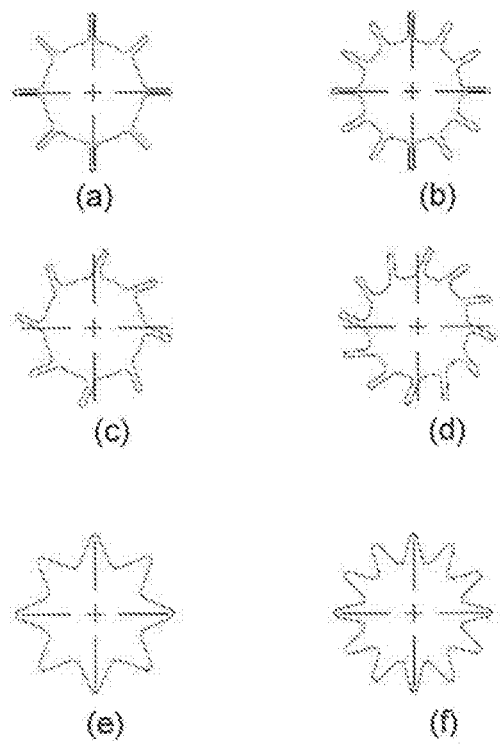
FIGS. 10 (a)-(f) to 14(a)-(e) show different embodiments of a rotatable exit element.
Figure 11:
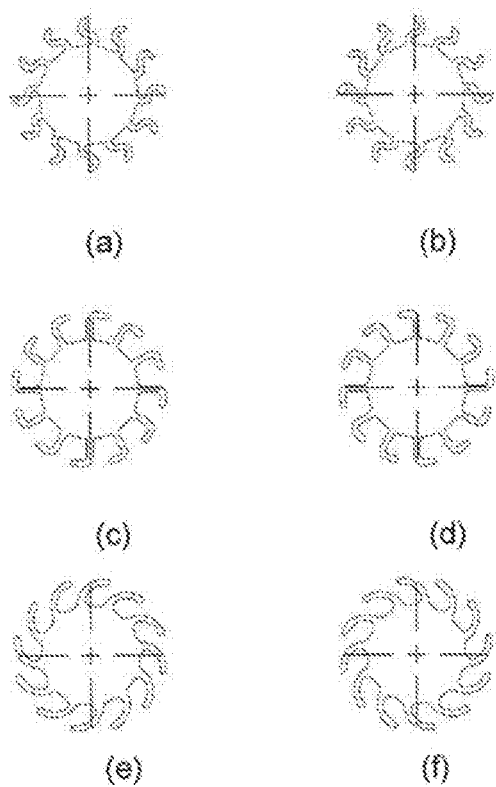
Figure 12:
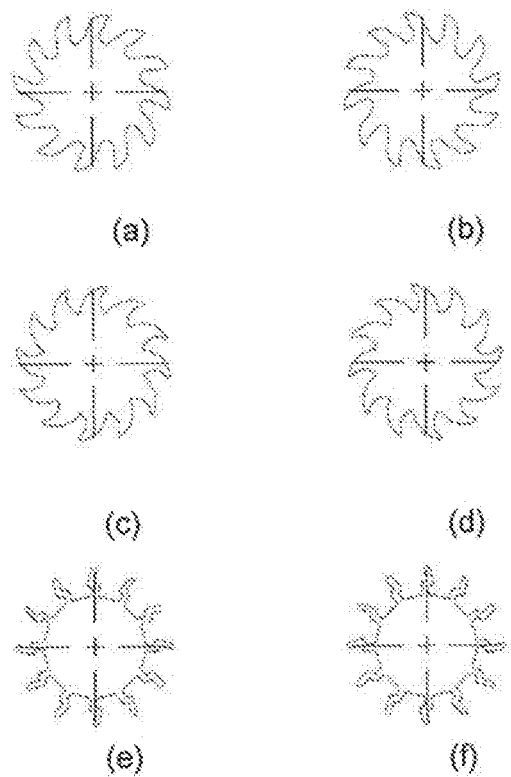
Figure 13:
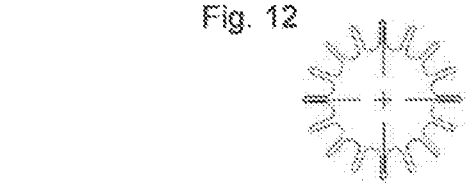
Figure 13:
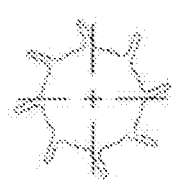
Figure 13:
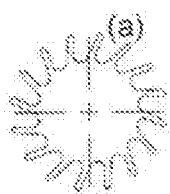
Figure 13:
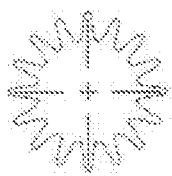
Figure 14:
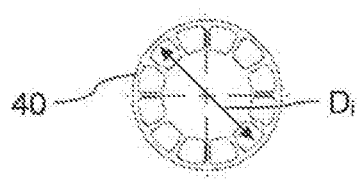
Figure 14:
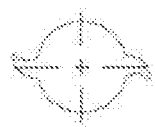
Figure 14:
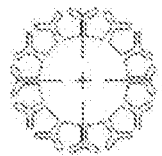
Figure 14:
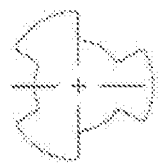
Figure 14:
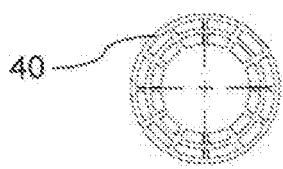

Regarding the third play it is noted that in the present embodiment, see FIGS. 5 and 9, it differs for the two pairs of rotatable screw element and rotatable exit element. Thus for the first pair of the rotatable screw element 7a and the rotatable exit element 9a the downstream end of the rotatable screw element 7a is flush with the adjacent part of the downstream end face 25 and accordingly the third play is equal to the second play 23. However, for the second pair of the rotatable screw element 7b and the rotatable exit element 9b the downstream end of the rotatable screw element 7b is flush with the downstream end of the rotatable screw element 7a leaving a play between the downstream end of the rotatable screw element 7b and the rotatable exit element 9a for these two elements not to collide or wear against each other. Further, in the present embodiment the rotatable exit elements 9a, 9b are planar at the annular portion comprising the exit openings, especially on the side thereof facing the downstream end of the feeding channel 3 and especially said annular portion of the rotatable exit element is planar with a thickness 30 in the range of 0.5 mm to 5 mm. The rotatable exit element 9b, especially the annular portion thereof, will thus be distanced from the downstream end of the helical ridge 17b by the sum of the second play 23, the thickness 30 of the annular portion of the rotatable exit element 9a, and the fourth play 29.

The step 27 e.g. has a height 27a, which is approximately equal to the sum of the thickness 30 of the annular portion of the rotatable exit element 9a and the fourth play 29.

In the embodiment shown in the Figures, see especially in FIGS. 4, 5 8, and 9 the rotatable exit elements 9a, 9b are fixed to the respective rotatable screw elements 7a, 7b for co-rotation therewith around the axis of rotation 7a', 7b'. Thus, the rotatable exit elements 9a, 9b each comprises a threaded pin 31a, 31b and the rotatable screw elements 7a, 7b each comprises a threaded hole 33a, 33b for receiving the respective threaded pin 31a, 31b. The rotatable exit elements 9a, 9b each comprises a slot 35a, 35b for receiving a screwdriver or the like. Thus the rotatable exit elements are in the present embodiment detachably fixed to the rotatable screw elements. The rotatable exit elements further each comprises a protrusion 37a, 37b that will abut against the downstream end of the respective rotatable screw element 7a, 7b and define the third play.

In the present embodiment the rotatable screw elements 7a, 7b per se are provided with a slot for a screwdriver or the like, of which the slot 39b of the rotatable screw element 7b is seen in FIG. 5. Thus, the rotatable screw elements 7a, 7b may be detached from their respective mounting (not shown) that may e.g. be screw mountings or bayonet mountings. The skilled person will appreciate that other mounting configurations are possible. Thus the mounting of the rotatable exit elements 9a, 9b might be bayonet mountings or other, or the rotatable exit element 9a, 9b might be permanently fixed to the respective rotatable screw elements 7a, 7b to be removed together therewith e.g. for cleaning or maintenance of the feeder device 1.

Referring now to FIGS. 10 to 19 embodiments of the rotatable exit elements will be described in more detail. It should be noted that for the embodiments as shown, clockwise rotation is intended, however the skilled person realizes this can be reversed, as needed depending on design or setup of the feeder device.

Figure 15:
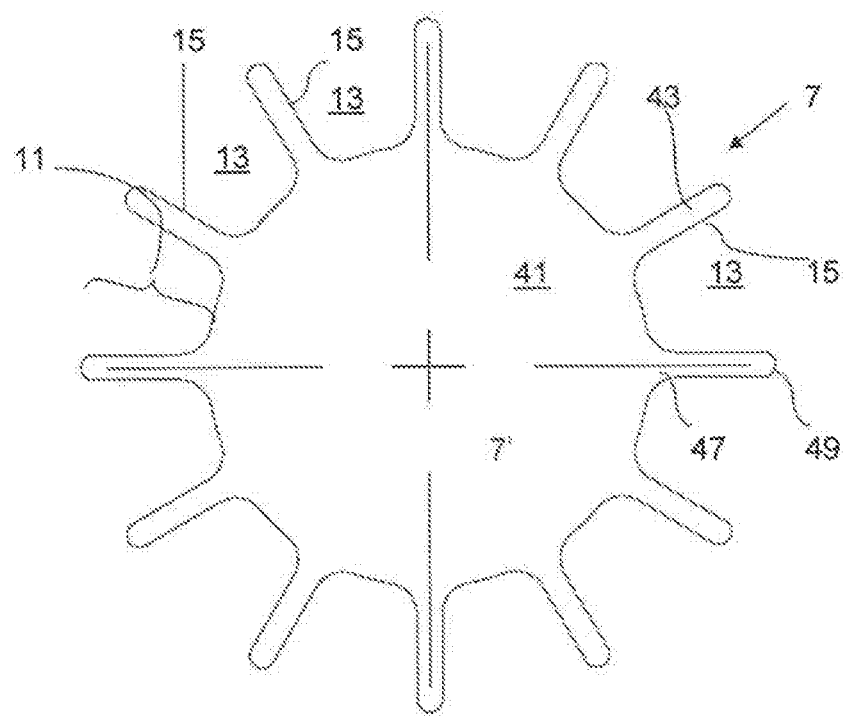
FIG. 15 is an enlarged view of the rotatable exit element shown in FIG. 10(b)

FIG. 15 shows a rotatable exit element 9, such as the rotatable exit element 9a or 9b shown in FIGS. 1-5 and 8, 9. The rotatable exit element 9 has an axis of rotation 7' extending perpendicular to the plane of the drawing. The rotatable exit element 9 comprises a central core portion 41 and protrusions 43 extending away from the central core portion. The protrusions 43 defines between them the exit openings 13 for the powder material to be fed by means of the feeding device 1, and the protrusions each has a root 47 at the central core portion 41 and a distal end 49 away from the central core portion 41. Like the rotatable exit elements 9a, 9b the rotatable exit element 9 comprises a slot (not shown) for a screwdriver or the like.

In the present embodiment the central core portion 41 has a diameter which is equal to or less than the core diameter of the rotatable screw element 7a, 7b, onto which the rotatable exit element 9 should be mounted, at the downstream end of the rotatable screw element 7a, 7b. The core diameter of the rotatable screw element 7a, 7b may be defined by a bottom of the helical valley 19a, 19b. Hereby is obtained that passage of the fed powder material is not obstructed by the central core portion 41, thereby reducing the risk of an increase in the pressure gradient experienced by the powder.

Further regarding embodiments of the rotatable exit element 9 a large variety is possible as will be illustrated in the following:

In the present embodiments, see FIGS. 10-15, the protrusions 43 are equidistantly spaced around the axis of rotation 7'.

Further, in the present embodiments all the protrusions are mutually similar in shape and size.

In some embodiments, see FIGS. 10a-10d, 11a-11f, 12e-12f, 13a-13c, 14a, 14c, 14e, and 15, the protrusions have a constant width from the root to the distal end. This provides for relatively large spaces between the protrusions i.e. relatively large exit openings 45.

In alternative embodiments, see FIGS. 10e-10f, 12a-12d, 13d, and 14b, the roots of the protrusions are wider than the distal ends of the protrusions. This provides for enhanced strength of the protrusions 43.

Further, in some embodiments, see FIGS. 10e-10f, 12c-12d, and 13d the roots of adjacent protrusions meet at the central core portion.

In some embodiments, see especially FIGS. 10a-10f, 13a, 13f, 14a, 14c, 14e, and 15, the protrusions are extending with the root and the distal end positioned on a common radius extending from the axis of rotation.

In some embodiments, see especially FIGS. 10c-10d, 11e, 12a, 12c, 13c, and 14b, the protrusions are extending with the distal end leading in the intended direction of rotation relative to the root. This provides for pushing the powder material in a direction at least slightly inwardly, towards the axis of rotation.

In some embodiments, see especially FIGS. 11f, 12b, 12d, and 13b, the protrusions are extending with the distal end trailing in the direction of rotation relative to the root. This provides for pushing the powder material in a direction at least slightly outwardly, away from the axis of rotation.

In some embodiments, see especially FIGS. 11a, 11b, 11e, 11f, 12c, 12, and 14b, the protrusions have curved extends from the root to the distal end. Hereby it is possible to push the powder material with a concave surface providing a gathering effect or a convex surface providing a spreading effect on the powder material.

In further embodiments, see FIGS. 11e, 11f, 12c, 12d, and 14b, the protrusions are extending in a C-shape. Hereby the protrusions may have curved extends with a constant curvature or a spiral curvature.

In other embodiments, see FIGS. 11a and 11b the protrusions are extending in an S-shape.

In yet other embodiments, see FIGS. 12e and 12f, the protrusions are extending in a Z-shape.

Generally, in the embodiments shown adjacent protrusions 43 define between them the exit openings 45 extending radially towards the axis of rotation 7' to define the diameter of the central core portion 41.

In some embodiments, see FIGS. 11c, 11d and 14c, the protrusions have at their distal ends at least one extension extending generally in a circumferential direction. Hereby the powder material may be contacted from a radial outside as seen relative to the axis of rotation.

In some embodiments, see FIGS. 14a and 14e, the protrusions are interconnected by at least one circumferential ring portion. Hereby is provided for better strength of the protrusion in the form of mutual support e.g. in case of powder material comprising hard crystals. In such embodiments especially the distal ends of the protrusions may be interconnected by an outer circumferential ring portion 40. The outer circumferential ring portion 40 has an inner diameter Di which preferably is not less, more preferably larger than the first diameter d of the feeding channel 3.

In an embodiment, see FIG. 14d, the protrusions each have a leading edge and a trailing edge both of which are extending along respective radii extending from the axis of rotation.

Referring to FIGS. 15 to 19 in which numeral 51 designates the side of the rotatable exit element 7 facing the downstream end 5 of the feeding channel 3 and thus being exposed to the powder material fed by the rotatable screw elements, the powder engaging edge 15 of the protrusions 43 maybe embodied in alternative ways.

Figure 16:
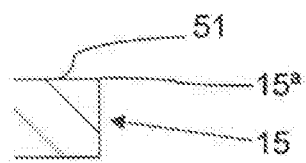
FIGS. 16 to 19 show cross-sections of different embodiments of the feeder device with different shapes of leading edges of protrusions of the rotatable exit element of FIG. 15.

In an embodiment, see FIG. 16, the powder engaging edge 15 is formed for a leading edge 15a of the protrusions 43, adjacent the downstream end, relative to the intended direction of rotation, to be rectangular.

Figure 17:
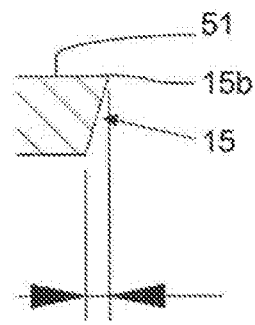

In another embodiment, see FIG. 17, the powder engaging edge 15 is formed for a leading edge 15b of the protrusions 43, adjacent the downstream end, relative to the intended direction of rotation, to form an acute angle. This embodiment may for some applications not be advantageous, for example where the powder being fed is comprising a certain amount of sensitive API, where the pressure from the sharper powder engaging edge on the powder being fed could lead to physical or chemical changes in these API. In fact, the opposite may be a more advantageous embodiment, use same FIG. 17, but where it is the trailing edge of the powder engaging edge being cut off in an acute angle, and the powder then experiences a lower pressure from the resulting blunt angle leading edge.

Figure 18:
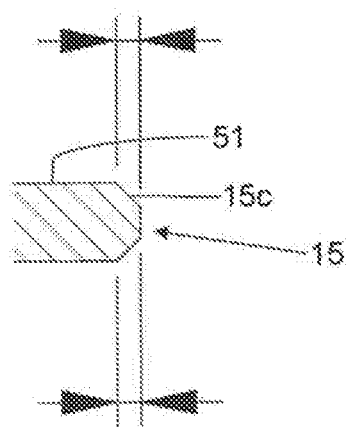

In yet another embodiment, see FIG. 18, the powder engaging edge 15 is formed for a leading edge 15c of the protrusions, adjacent the downstream end, relative to the intended direction of rotation, to be chamfered.

Figure 19:
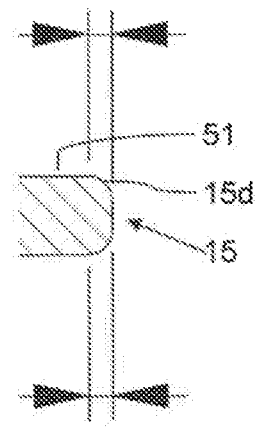

In yet another embodiment, see FIG. 19, the powder engaging edge 15 is formed for a leading edge 15d of the protrusions, adjacent the downstream end, relative to the intended direction of rotation, to be rounded.

When applying a chamfered or rounded leading edge of the powder engaging edge, a more gentle push or sideways urging power may be applied to the powder, which may reduce the risk of pressure being built up on the powder being fed out.

The material of the exit element may be any suitable metal, ceramics, polymer, elastomer, or combinations thereof; advantageously the surface material is easily cleanable. Thus the exit elements may comprise a core of one material and a surface layer of another material. It is thereby possible to design the exit elements with a specific rigidity of the protrusions 43 while providing a more or less hard or soft surface. Especially the pliability (bendiness) of powder engaging edges 15 may be designed in order to accommodate the powder being fed in the feeder, so the more sensitive the powder the more flexible/pliable the material used, advantageously at least in a direction transverse to the flow direction. Generally, non-animal materials may be preferred due to GMP (Good Manufacturing Practice) requirements as applied in the pharmaceutical industry. As an example the exit element may comprise a core of stainless steel and a surface of a polymer and/or an elastomer. For some embodiments stainless steel is preferred, but also ceramics, plastics/polymers/elastomers may be used. Further the protrusions may be of a brush configuration instead of impeller-like arms as shown. Also any combination is possible.

It should be understood that each different feature relating to the embodiments of the exit elements, whether different spoke number, angle, size, tilt, or element material, all is available for the skilled person to construct the exit element so as to match the requirements of the exited powder material being transported/dosed and the design of the feeder.

Referring now to FIGS. 20 to 25 it is noticed that different embodiments of the conveying element is possible within the scope of the invention.

Figure 20:
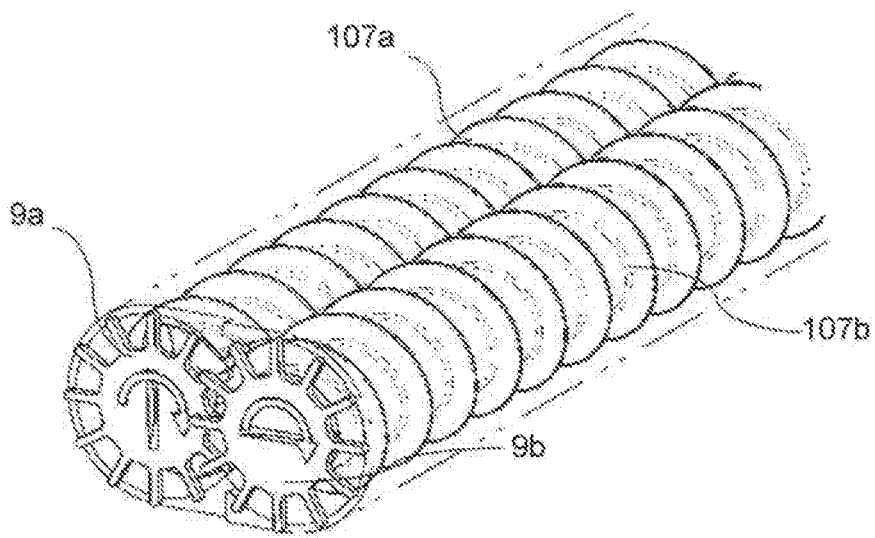
FIG. 20 is a view similar to FIG. 2 showing the feeder device in a second embodiment having conveying elements of the auger screw element type.
Figure 21:
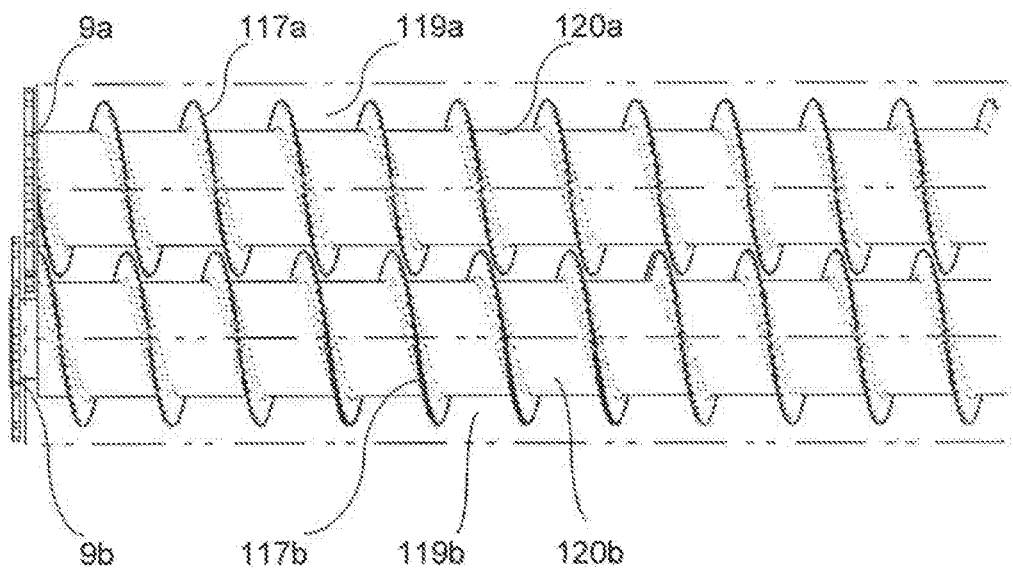
FIG. 21 is a top view of the feeder device shown in FIG. 20.

Thus FIGS. 20 and 21 show an embodiment of the conveying element comprising two auger type screw elements 107*a*, 107*b* comprising at least one helical ridge 117*a*, 117*b*, and valleys 119*a*, 119*b* between adjacent turns of helical ridge 117*a*, 117*b* which screw element have a cylindrical bottom part 120*a*, 120*b* defining a core of the screw element 107*a*, 107*b*. Like the embodiment shown in FIGS. 1 to 9, the embodiment shown in FIGS. 20 and 21 comprises rotatable exit elements 9*a*, 9*b*, etc. It is noted that the screw elements 117*a*, 117*b* as shown e.g. in FIG. 21 are embodied with single-winding screws, i.e. one helix extending along the length of it. This type of auger screw element is generally known in the field to the skilled person.

Figure 22:
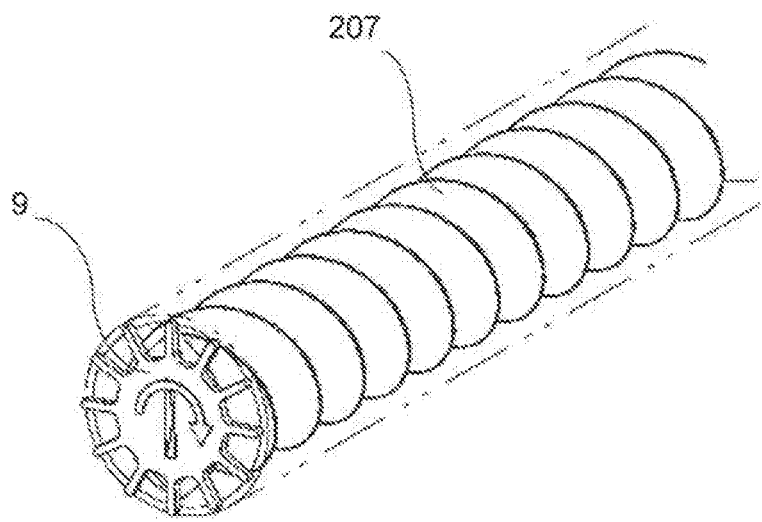
FIG. 22 is a view showing the feeder device in a third embodiment with a single conveying element with the barrel removed.
Figure 23:
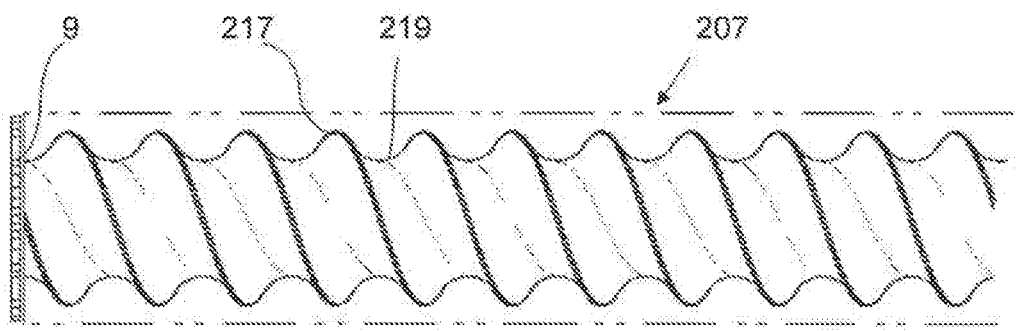
FIG. 23 is a top view of the feeder device shown in FIG. 22.

FIGS. 22 and 23 show an embodiment of the conveying element comprising a single screw element 207 comprising, like the embodiment shown in FIGS. 1 to 5, a concave type screw, and comprising a helical ridge 217 and a valley 219 between adjacent turns of the helical ridge 217. Like the embodiment shown in FIGS. 1 to 9, the embodiment shown in FIGS. 22 and 23 comprises a rotatable exit element 9. It is noted that the screw element 207 as shown in FIG. 23 is embodied with a double-winding screw, i.e. two helixes intertwined with each other.

In one embodiment there may be provided what is known as distributive flow elements such as interrupted screw elements comprising elements provided along the axis of rotation and carrying paddle-like protrusions having a pitch to provide for propelling powder towards the downstream end 5.

Other combinations are possible, preferably at least a part of the screw or screws are conveying sections. Also, other section designs are possible, hereunder kneading, mixing, cutting, pressure build up/down, and other element designs are possible. Further, as mentioned before, alternatives to screw configurations are conceivable, such as paddles or active elements. Further also other processes such as liquid, heat, weighing applications, and other processes may be applicable to the transport/dosing sections here.

Note: All embodiments of the device shown and described above may as known to the skilled person be provided with parts necessary for the operation of the feeding device, such as one or more motors for driving the conveying elements, such as the one or more rotating screw elements; auxiliary parts such as heating or cooling arrangements, weighing devices, Process Analytical Technology (PAT) such as analytical sensors; and control equipment.

What is claimed is:

1. A feeder device for feeding powder, comprising a feeding channel with a downstream end, said feeding channel comprising at least two conveying elements for conveying the powder material to the downstream end, and two rotatable exit elements provided at the downstream end of the feeding channel, said rotatable exit elements each comprising an annular portion defining exit openings defined by powder engaging edges, wherein the rotatable exit elements are positioned transversally outside the feeding channel in a proximity of the downstream end of the feeding channel, wherein the feeding channel comprises two merged portions each having a circular outline, each circular outline having a first, inner diameter and the rotatable exit elements each having a second, outer diameter, and wherein the respective second, outer diameter is equal to or larger than the respective first, inner diameter, and wherein a play is present between overlapping portions of the two rotatable exit elements.

2. The feeder device according to claim 1, wherein the at least two conveying elements are rotatable conveying elements having an axis of rotation extending along the feeding channel and able to be rotated around the axis of rotation in at least one direction.

3. The feeder device according to claim 2, wherein the at least two rotatable conveying elements are rotatable screw elements having respective, mutually parallel axes of rotation.

4. The feeder device according to claim 3, wherein the at least two rotatable screw elements each comprises at least one helical ridge, said helical ridge having a pitch with one of a constant value; and an increasing value towards the downstream end.

5. The feeder device according to claim 3, wherein the at least two rotatable screw elements each comprises at least one helical ridge, and another play is present between a top of said helical ridge and an internal side wall of the feeding channel.

6. The feeder device according to claim 3, wherein the at least two rotatable screw elements each is a concave type screw comprising at least one helical ridges, and valleys between adjacent turns of the helical ridges have a curved extent in an axial cross section through the axis of rotation.

7. The feeder device according to claim 3, wherein the at least two rotatable screw elements each is an auger type screw element comprising at helical ridges, and valleys between adjacent turns of the helical ridges have a cylindrical bottom part defining a core of the rotatable screw element.

8. The feeder device according to claim 3, wherein at least one of the rotatable screw elements comprises at least one helical ridge, and a another play is present between a downstream end of said at least one helical ridge and a respective rotatable exit element, said other play being in a range of 0 to 11 mm, excluding 0.

9. The feeder device according to claim 8, wherein said at least one helical ridge extends substantially entirely to the rotatable exit element.

10. The feeder device according to claim 3, wherein the two rotatable exit elements each is fixed to the respective at least one rotatable screw elements for co-rotation therewith around the axis of rotation of the respective rotatable screw elements.

11. The feeder device according to claim 3, wherein at least one of the two rotatable exit elements comprises a central core portion and protrusions extending away from the central core portion, said protrusions defining between them exit openings for the powder material, and said protrusions each having a root at the central core portion and a distal end away from the central core portion.

12. The feeder device according to claim 11, wherein a diameter of the central core portion is equal to or less than a core diameter of the rotatable screw elements at downstream ends of the rotatable screw elements.

13. The feeder device according to claim 11, wherein at least two of the protrusions are equidistantly spaced around the axis of rotation.

14. The feeder device according to claim 11, wherein at least two of the protrusions are mutually similar in at least one of shape and size.

15. The feeder device according to claim 11, wherein at least one of the protrusions has substantially a constant width from the root to the distal end.

16. The feeder device according to claim 11, wherein the root of at least one of the protrusions is wider than the distal end of the at least one of the protrusions.

17. The feeder device according to claim 16, wherein at least two of the roots of adjacent protrusions meet at the central core portion.

18. The feeder device according to claim 11, wherein at least one of the protrusions extends with the root and the distal end positioned on a common radius extending from the axis of rotation.

19. The feeder device according to claim 11, wherein at least one of the protrusions extends with the distal end leading in an intended direction of rotation relative to the root.

20. The feeder device according to claim 11, wherein the at least one protrusion extends with the distal end trailing in an intended direction of rotation relative to the root.

21. The feeder device according to claim 11, wherein at least one of the protrusions has a curved extent from the root to the distal end.

22. The feeder device according to claim 21, wherein at least one of the protrusions extends in one of a C-shape; an S-shape; and a Z-shape.

23. The feeder device according to claim 11, wherein adjacent protrusions between them define the exit openings extending radially towards the axis of rotation to define a diameter of the central core portion.

24. The feeder device according to claim 11, wherein the distal end of at least one of the protrusions has at least one extension extending generally in a circumferential direction.

25. The feeder device according to claim 11, wherein at least two of the protrusions are interconnected by at least one circumferential ring portion.

26. The feeder device according to claim 25, wherein the distal ends of at least two of the protrusions are interconnected by an outer circumferential ring portion.

27. The feeder device according to claim 11, wherein at least one of the protrusions has a leading edge and a trailing edge both of which extend along respective radii extending from the axis of rotation wherein the leading edge of the at least one of the protrusions, adjacent the downstream end, relative to an intended direction of rotation is one of rectangular; forming an acute angle; rounded; and chamfered.

28. The feeder device according to claim 3, wherein at least one of the rotatable screw elements comprises at least one helical ridge, and another play is present between a downstream end of said at least one helical ridge and a respective rotatable exit element, said other play being in a range of 0 to 3 mm, excluding 0.

29. The feeder device according to claim 1, wherein another play is present between the two rotatable exit elements and a downstream end face defining the downstream end of the feeding channel, said other play being in a range of 0 to 8 mm, excluding 0.

30. The feeder device according to claim 1, wherein the play between the overlapping portions of the two rotatable exit elements is in a range of 0 to 8 mm, excluding 0.

31. The feeder device according to claim 1, wherein at least one of the two rotatable exit elements is planar at the annular portion at least on a side thereof facing the downstream end of the feeding channel.

32. The feeder device according to claim 31, wherein the annular portion of said at least one rotatable exit element is planar with a thickness in a range of 0.5 mm to 5 mm.

33. The feeder device according to claim 1, wherein another play is present between the two rotatable exit elements and a downstream end face defining the downstream end of the feeding channel, said other play being in a range of 0.1 mm to 5 mm.

34. The feeder device according to claim 1, wherein another play is present between the two rotatable exit elements and a downstream end face defining the downstream end of the feeding channel, said other play being in a range of 0.5 mm to 3 mm.

35. The feeder device according to claim 1, wherein the play between the overlapping portions of the two rotatable exit elements is in a range of 0.1 mm to 5 mm.

36. The feeder device according to claim 1, wherein the play between the overlapping portions of the two rotatable exit elements is in a range of 0.5 mm to 3 mm.

\* \* \* \* \*